(12) United States Patent
Shah et al.

(10) Patent No.: US 6,944,647 B2
(45) Date of Patent: Sep. 13, 2005

(54) METHODS AND APPARATUS FOR BOOKMARKING AND ANNOTATING DATA IN A LOG FILE

(75) Inventors: Rajeeta Lalji Shah, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 09/895,116

(22) Filed: Jun. 29, 2001

(65) Prior Publication Data

US 2003/0005082 A1 Jan. 2, 2003

(51) Int. Cl.⁷ .............................................. G06F 13/00
(52) U.S. Cl. ....................................................... 709/206
(58) Field of Search ............................. 709/204, 205, 709/206, 207, 217, 218, 200, 203; 345/733, 738, 739, 745

(56) References Cited

U.S. PATENT DOCUMENTS 6,549,217 B1 * 4/2003 De Greef et al. ........... 345/745

* cited by examiner

Primary Examiner—Robert B. Harrell
(74) Attorney, Agent, or Firm—Duke W. Yee; Jeffrey S. LaBaw; Wayne P. Bailey

(57) ABSTRACT

A method, program and system for editing data in a distributed computer network are provided. The invention comprises, in response to a request from a user, opening a log file and noting an entry associated with a message of interest. A message locator finds the message of interest in a designated location and bookmarks the message. A bookmark I/O component then locates and modifies the bookmarked message, and rewrites the modified message back to the designated location. The user can then view the modified message via a display device (i.e. GUI).

35 Claims, 5 Drawing Sheets

METHODS AND APPARATUS FOR BOOKMARKING AND ANNOTATING DATA IN A LOG FILE

CROSS REFERENCE TO RELATED APPLICATIONS

The present application is related to co-pending U.S. patent application Ser. No. 09/895,979, filed on Jun. 29, 2001 (Current Status: pending) entitled "METHODS AND APPARATUS IN A LOGGING SYSTEM FOR THE TRACKING OF TASKS SOLELY BASED ON FUNCTION FOR DATA ANALYSIS", to co-pending U.S. patent application Ser. No. 09/895,229, filed on Jun. 29, 2001 (Current Status: Allowed) entitled "METHODS AND APPARATUS IN DISTRIBUTED REMOTE LOGGING SYSTEM FOR REMOTE ADHOC DATA ANALYSIS CUSTOMIZED WITH MULTILEVEL HIERARCHICAL LOGGER TREE", and to co-pending U.S. patent application Ser. No. 09/895,459, filed on Jun. 29, 2001 (Current Status: Issued) entitled "METHODS AND APPARATUS IN A LOGGING SYSTEM FOR THE ADAPTIVE HANDLER REPLACEMENT IN ORDER TO RECEIVE PRE-BOOT INFORMATION". The content of the above mentioned commonly assigned, co-pending U.S. patent applications are hereby incorporated herein by reference for all purposes.

BACKGROUND OF THE INVENTION

1. Technical Field

The present invention relates generally to computer network environments, and more specifically it relates to bookmarking logged data.

2. Description of Related Art

Logging is the process of recording system events so that those actions can be reviewed later. Handlers are software objects that direct messages recorded by a logger to a destination. Messages can be directed to a file, a database, a console screen, or to other destinations.

Currently, adding notes to a file on a certain area of interest typically involves editing a copy of the file and creating new lines for bookmarks. This process is problematic if this information has to be shared across locations or by multiple people. The situation becomes even more problematic if two or more people are simultaneously analyzing the same log and wish to add a bookmark or a note to a particular event message or a group of messages. Current approaches are limited to I/O at the file level. This allows many people to view data, but only one can actually write to it. In addition, current approaches do not allow for distributed logging and distributed editing of log files. Current techniques also require parsing through large amounts of distributed kernel service (DKS) log data files due to installation and scale requirements. These techniques cannot pinpoint specific distributed data.

Therefore, it would be desirable to have a method of distributed editing of data in a distributed computer environment by means of bookmarking logged files, without having to edit the files and parse large amounts of data.

SUMMARY OF THE INVENTION

The present invention provides a method, program and system for editing data in a distributed computer network. The invention comprises, in response to a request from a user, opening a log file and noting an entry associated with a message of interest. A message locator finds the message of interest in a designated location and bookmarks the message. A bookmark I/O component then locates and modifies the bookmarked message, and rewrites the modified message back to the designated location. The user can then view the modified message via a display device (i.e. GUI).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
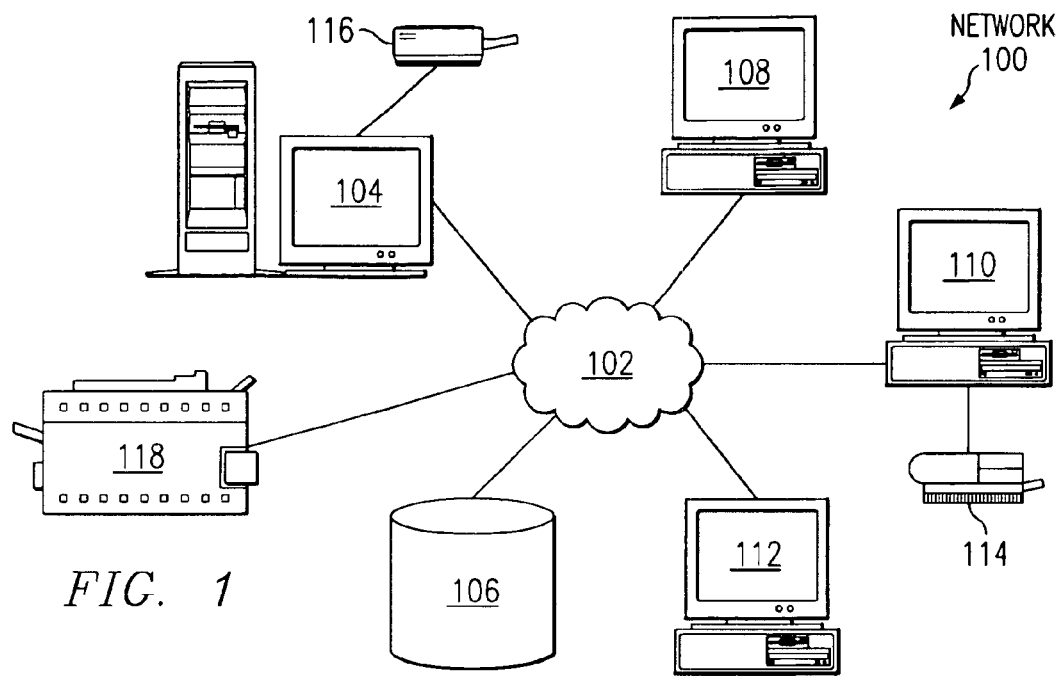
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
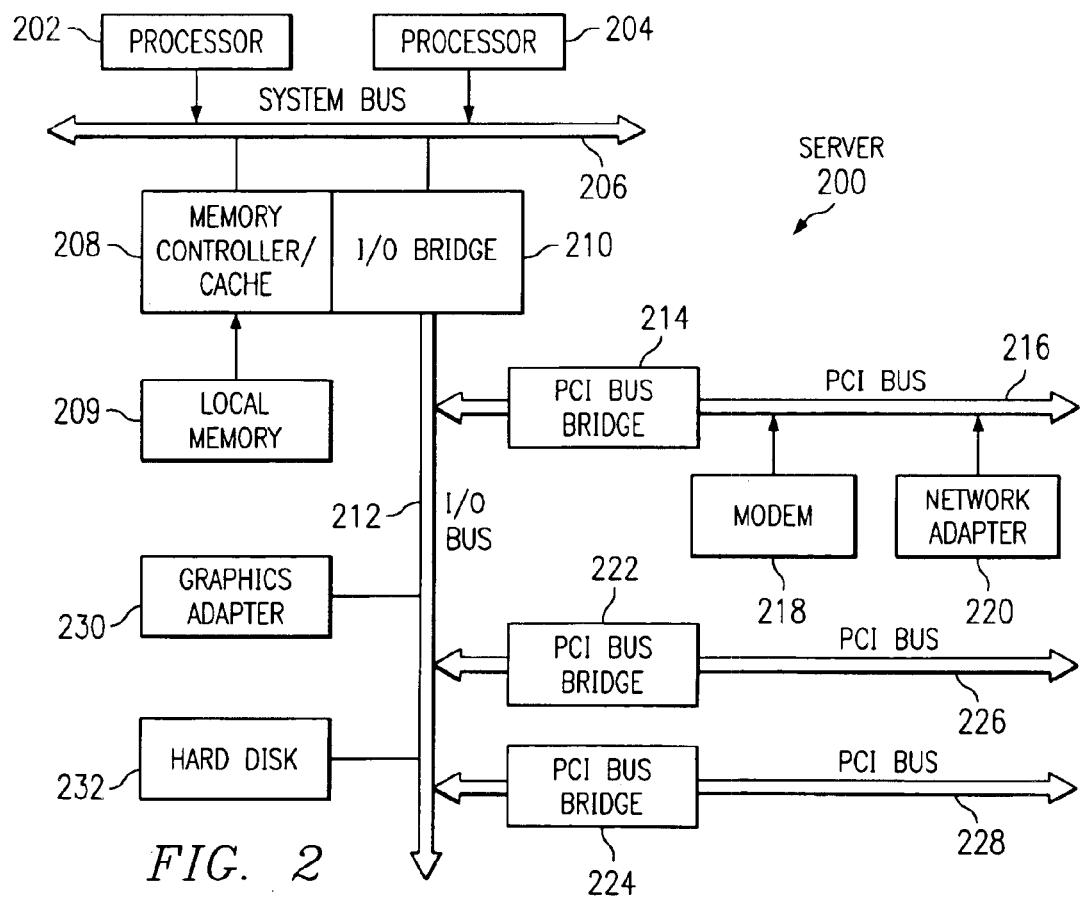
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
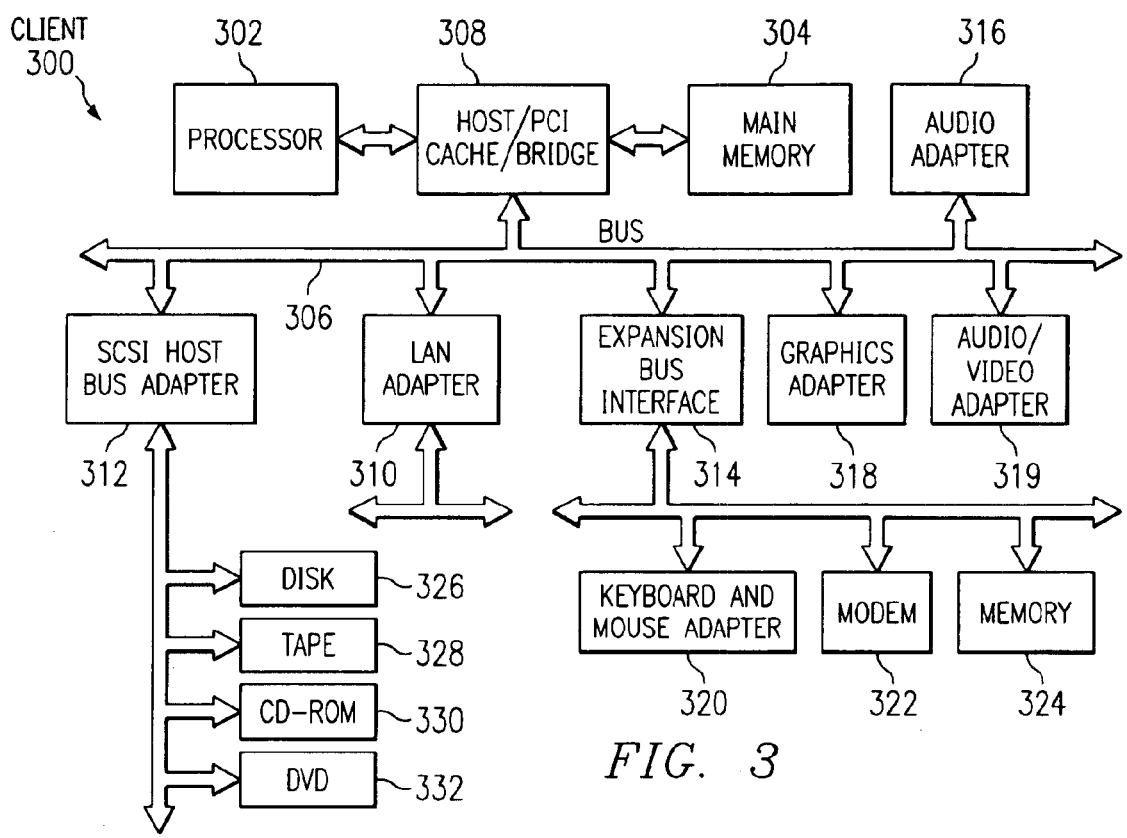
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a logging system with distributed, multilevel architecture which allows remote control of logging elements. The present invention also allows the logging system to be used standalone or in a distributed environment. The logging system allows a system to produce large amounts of data for local consumption, as opposed to a small amount of data for storage in a central remote repository. Dual output is easily configured for an administrator wishing to see logs on the console, in multiple files and in a database for future queries.

Furthermore, the present invention provides for the creation and logging of a taskID. This allows a component that is logging to create a task identification (TaskID) which follows this logging task (which may flow across multiple components and ORBs) until completion. The TaskID is passed in the thread context in local methods and in the message context in remote method invocations.

Figure 4:
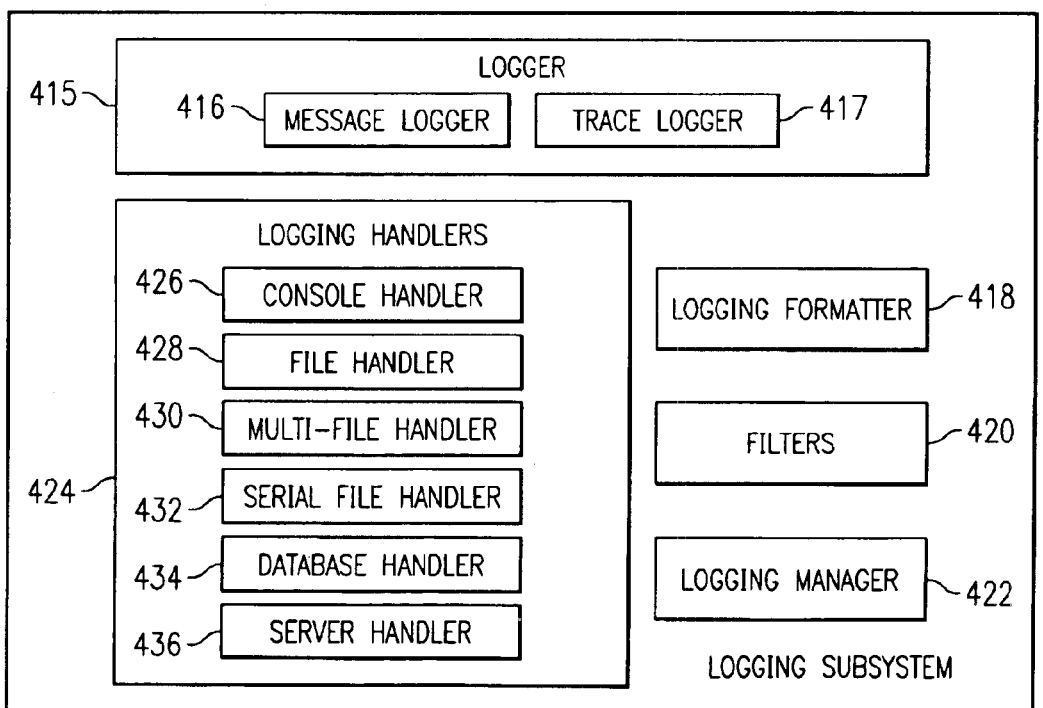
FIG. 4 depicts a schematic diagram illustrating a logging subsystem in accordance with the present invention.

Referring to FIG. 4, a schematic diagram illustrating a logging subsystem is depicted in accordance with the present invention. The logging subsystem 400 uses several objects to record system events. These objects include loggers 415, handlers 424, filters 420 (also referred to as masks), and formatters 418.

Loggers are software objects that record events that occur while a component is operating. The Logging subsystem supports two types of loggers: message loggers 416 and trace loggers 417. Message loggers 416 are used to record textual messages from a component. These messages are internationalized for individual locales. Trace loggers 417 are used to capture information about the operating environment when component code fails to operate as intended. Support personnel use the information captured by trace loggers 417 to trace a problem to its source or to determine why an error occurred. Generally, this information is not enabled by default. Because trace messages are intended for support personnel, they are generally written to a file that can be viewed during a postmortem Examination.

Handlers 424 are software objects that direct messages recorded by a logger to a destination. Messages can be directed to a file, a database, a console screen, or to other destinations. Handlers are associated with loggers to send information recorded by a logger to the desired destination. The present invention provides the configuration definitions for the following types of handlers:

Console Handler 426 writes log records to a console.

File Handler 428 writes log records to a file.

Multifile Handler 430 writes log records to a rotating set of log files.

Serial File Handler 432 writes log records to files as serialized objects.

Database Handler 434 writes log records to a database.

Server Handler 436 sends log records in batch mode to a remote logging server for processing.

Filters 420 can be applied to loggers, to handlers, or to both loggers and handlers. When applied to a logger, the filter determines which types of message and trace records the logger processes. When applied to a handler, the filter determines which types of message and trace records the handler sends to a destination. Filters 420 work by comparing a log record type against a set of criteria, or a query, contained within the filter 420.

Formatters 418 are software objects used to format the output of information contained in log records. In general, formatters 418 can be used to tailor things like date and time stamps to local conventions. A single formatter can be used by multiple handlers. Having numerous loggers, handlers, filters, and formatters can cause an undue amount of logging administration to perform. To reduce the administration burden, one can create "groups".

A group contains loggers, handlers, filters, or formatters that have common properties. By creating groups, a newly created logger, handler, filter, or formatter with unset properties can inherit values for those properties from the group. If a logger, handler, filter, or formatter belongs to a group and its properties are updated, all other loggers, handlers, filters or formatters in that group will also have that property updated. This eliminates the need for manually updating individual logger, handler, filter, or formatter properties.

The Log Manager 422 is the heart of the logging system. It creates and configures all of the previously discussed logging objects. It is coupled with the ORB, the Configuration Service, and the Directory Service to respond to component and application requests to send log messages to handlers and formatters. Each ORB has a log manager associated with it. The handlers may be local or remote with respect to the originating application. It is useful at times to refer to loggers, handlers, filters, and formatters using a generic term that includes one or more of these software objects. The term "logging element" will be used when a reference to a particular kind of logging object, such as a formatter object, is not necessary.

The present invention uses existing logging subsystem elements to find messages, via bookmarks, that need to be modified. Smart bookmark-logging-enabled readers can be used to perform additional tracking of status via bookmark data. Additional data can be gathered based on a user, ORB, etc., and automatically added on the user's behalf in order to convey more information to another user reading this bookmark's data. This approach allows for distributed editing within the distributed network, enabling multiple administrators to simultaneously edit logging data.

In the present invention, data serves as both a bookmark locator and user customized data attached to logging data. GUI and CLI are used to read, edit, or filter bookmark data. The user can add (edit) logging data such as simple notes tagged to a single message, or notes tagged to a group of messages (duration).

Figure 5:
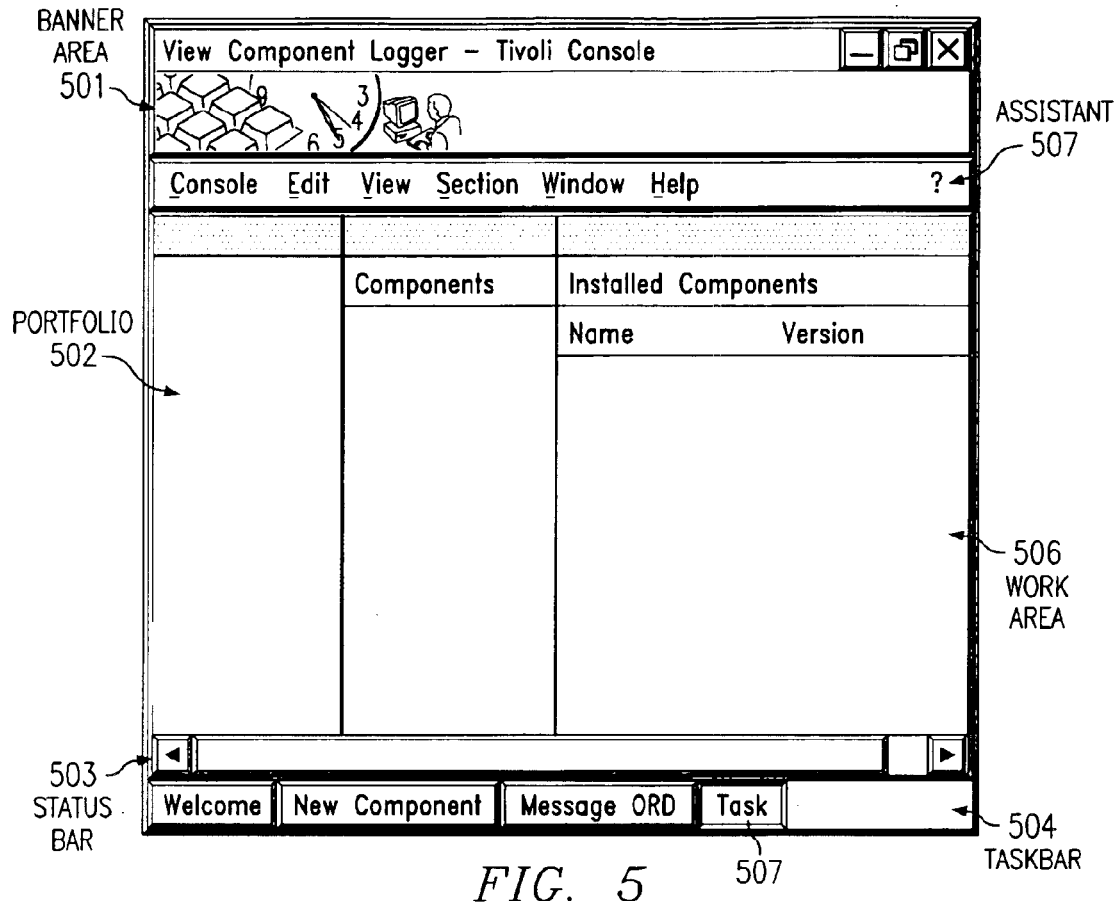
FIG. 5 depicts a pictorial image illustrating a GUI console in accordance with the present invention.

Referring to FIG. 5, a pictorial image illustrating a GUI console is depicted in accordance with the present invention. The Console 500 is the role-based GUI for performing tasks using management software. It presents only the tasks that are relevant to a particular role, and enables the user to perform tasks without having to understand the details of the underlying software. The Console 500 also provides consistent controls and behaviors across tasks and includes embedded user assistance. A "role" is a job function, such as "software distributor", that identifies the tasks that can be performed and the resources to which a user has access. A user might be assigned one or more roles depending on the duties that the user performs. A "task" represents one or more software components that run as an independent entity to accomplish a user's work.

The banner area 501 between the title bar and the menu bar that can serve as a Web browser. This optional area can be customized by a system administrator to include relevant information for a particular organization. For example, an organization might want to include the role description for a particular user, the company logo, or links to Internet and intranet sites in this area. The portfolio 502 is a container for the tasks that are relevant for a given role. When open, the portfolio 502 displays within the Console 500 to the left of the work area 506. When closed, the portfolio 502 is indicated by the portfolio handle. The status bar 503 is located below the work area 506 that is divided into two sections. The section on the left contains information about the object over which the mouse pointer is hovering. The section on the right contains a progress indicator or status information about the task that is running. The taskbar 504 is located at the bottom of the window that contains a task button for each task that is running. When a user right-clicks the background of the taskbar 504, the context menu for the taskbar 504 opens. The task button 505 on the taskbar 504 represents a task that is running. A task might have multiple windows associated with it. When a user clicks the task button 505, the window associated with the task opens in the work area 506. When the user right-clicks a task button 505, the context menu for that task opens. Each task button 505 also includes a small icon that conveys the current status of the task. The work area 506 is the area in which the GUI for a task is displayed. This area does not include the portfolio 502 and the Assistant 507. The assistant 507 is the place to go for answers to questions. The assistant 507 is opened by the question mark located on the far right of the toolbar or in the upper right of any detached window. When it is open, the assistant 507 displays within the Console 500 to the right of the work area. It provides contextual help information for the task that you are performing, as well as reference information.

The present invention also provides a CLI that allows the user to perform system operations from a command line instead of using the GUI Console 500. The command line interface can be run without the GUI 500 running or in a separate window while the GUI 500 is also running. The CLI provides complete control of the managed environment and can easily be used by shell scripts to perform complex sequences of commands.

Figure 6:
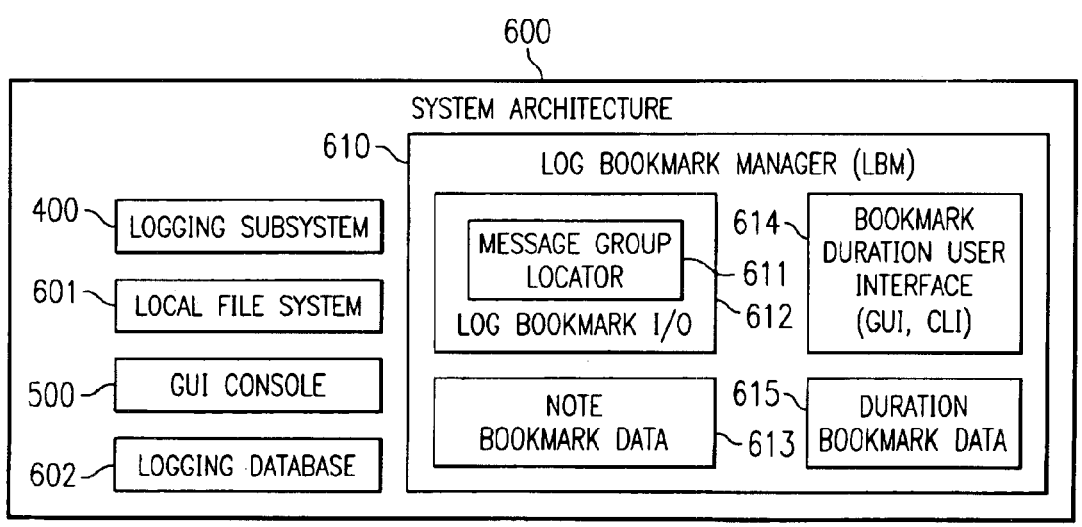
FIG. 6 depicts a schematic diagram illustrating the system architecture for bookmarking log data in accordance with the present invention.

Referring to FIG. 6, a schematic diagram illustrating the system architecture for bookmarking log data is depicted in accordance with the present invention.

Figure 7:
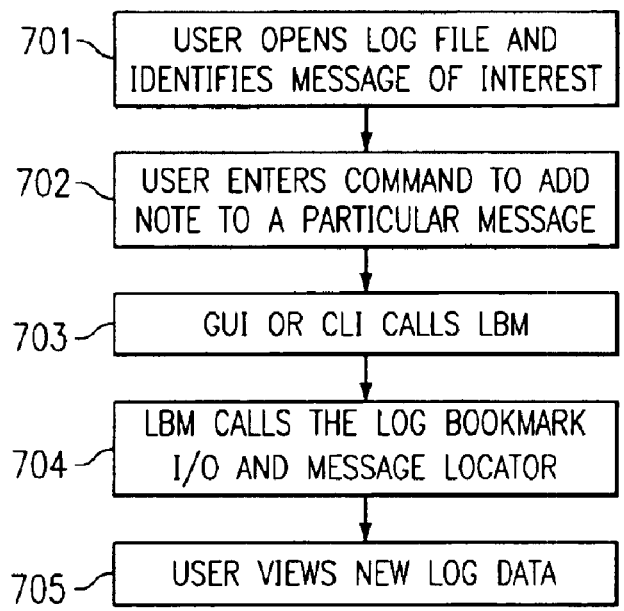
FIG. 7 depicts a flowchart illustrating an overview of the bookmarking process flow, using the architecture in FIG. 6, in accordance with the present invention.

Referring to FIG. 7, a flowchart illustrating an overview of the bookmarking process flow, using the architecture in FIG. 6, is depicted in accordance with the present invention. The user opens a log file from the GUI console 500, or by using an OS file reader, and identifies a particular message of interest via filters or manual inspection (step 701). An example of a message of interest is:

07:17:41.139 FNGDR3012E The Messaging Service for the directory running on the local ORB was unable to subscribe to event messages. No directory events can be processed by the ORB.

The user enters a command to note a particular message (step 702). The user can enter the command using a log CLI to add the note "look here ASAP" to a message. Alternatively, the user may enter the data using a GUI, such as GUI Console 500. The CLI or GUI then calls the Log Bookmark Manager (LBM) 610 to create a BookmarkNote (step 703).

Figure 8:
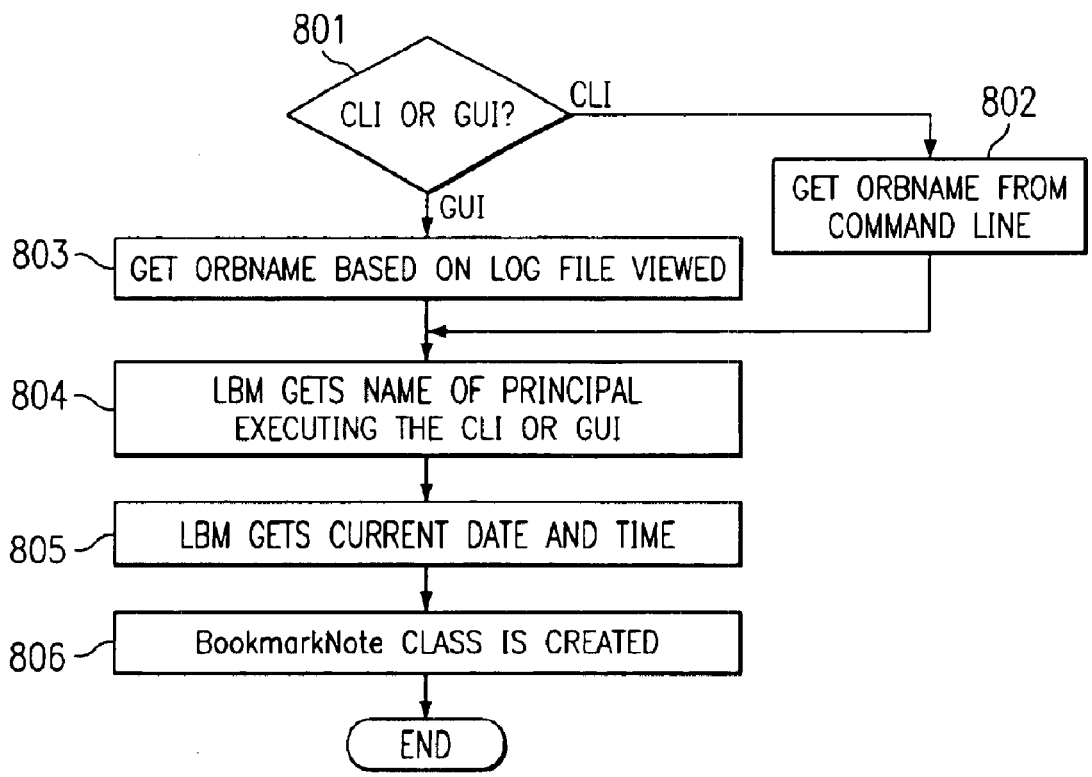
FIG. 8 depicts a flowchart illustrating the process of creating BookmarkNote data in accordance with the present invention.

Referring to FIG. 8, a flowchart illustrating the process of creating BookmarkNote data is depicted in accordance with the present invention. After the LBM 610 is called, the system determines the means of command input (step 801). If the user uses a CLI, the LBM 610 gets an orbname from the option on the command line (step 802). If the user relies on a GUI 500, the LBM 610 gets the orbname based on the particular log file that is being viewed with the GUI 500 (step 803).

Once the needed orbname is retrieved, the LBM 610 gets the name of the principal executing the CLI or GUI from the DKS security subsystem (step 804). The LBM 610 then determines the current date and time in order to note the time of bookmark creation (step 805). Based on the information gathered in the previous steps, the LBM 610 creates a BookmarkNote data 613 (step 806). Bookmarks can be sorted according to time, date, and/or the administrator editing the data.

Referring back to FIG. 7, the LBM 610 calls the Message group locator 611 and Log Bookmark I/O 612 (step 704).

The Message group locator 611 locates the log file 601 or database 602 that needs to be updated with the BookmarkNote data 613, and the Log Bookmark I/O 612 reads the old log data and locates the message data to be modified, adds the new BookmarkNote data 613, and then writes the new data back to the file 601 or database 602.

Figure 9:
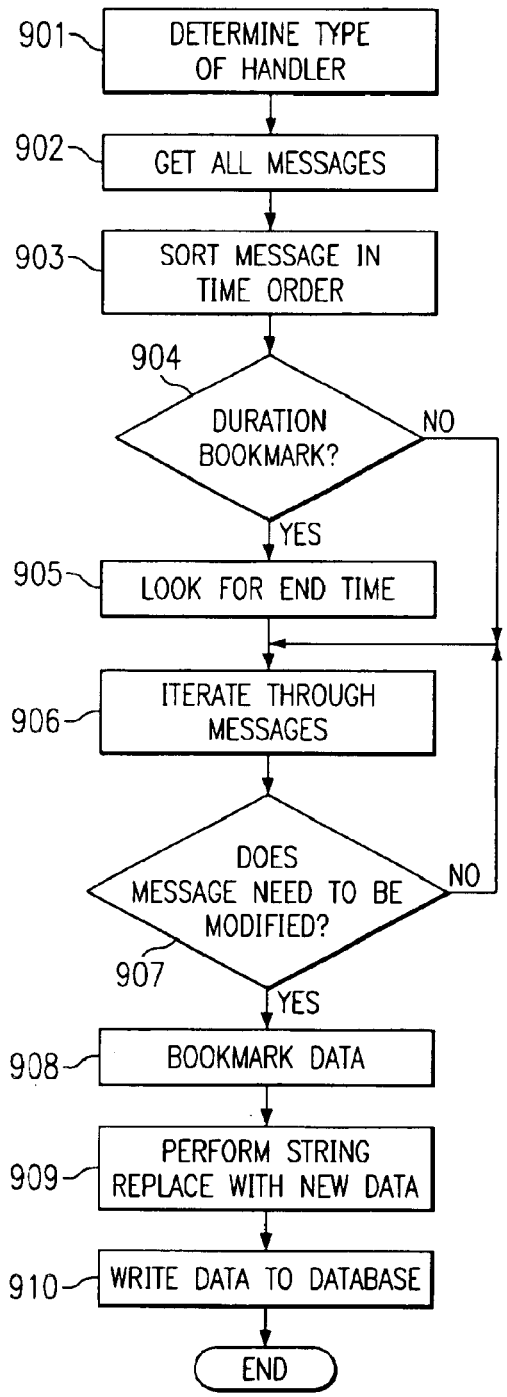
FIG. 9 depicts a flowchart illustrating the process of bookmarking and modifying messages via the Message group locator and Log Bookmark I/O, is depicted in accordance with the present invention.

Referring to FIG. 9, a flowchart illustrating the process of bookmarking and modifying messages via the Message group locator 611 and Log Bookmark I/O 612, is depicted in accordance with the present invention. The Message group locator 611 first determines the type of handler being used (step 901). If the handler is local, the data will be read from and written to local log file 601. If the handler is distributed, the data will be read from and written to the logging database 602. After the Message group locator 611 has determined the handler type, it gets all the messages from the proper location (step 902) and sorts them in time order (step 903).

The Message group locator 611 then determines if the messages are grouped by duration (step 904). If there is no duration grouping, the Message group locator 611 iterates through the messages individually until it finds the message that needs to be modified (steps 906 and 907).

If the messages are grouped by duration, the Message group locator 611 looks for an end time (step 905). In duration bookmarking, messages are grouped according to start and end times, and possibly start and end dates. All messages falling within the specified start and end times are treated as a single group for purposes of bookmarking and modification.

In the absence of duration grouping, there is a start time (log time) but no end time. In this manner, individual messages are treated as groups of one.

After the Message group locator 611 finds a message to be modified, it bookmarks the data (step 908). The Log Bookmark I/O 612 then locates the bookmarked data, gets the proper BookmarkNote data 613 and performs a string Replace with new data (step 909). The data is then written to the local file 601 or logging database 602 (step 910).

Referring back to FIG. 7, after the bookmark has been added to the log data, the user views the new log data using GUI console 500 or a file reader program provided by the OS editor (step 705).

Figure 10:
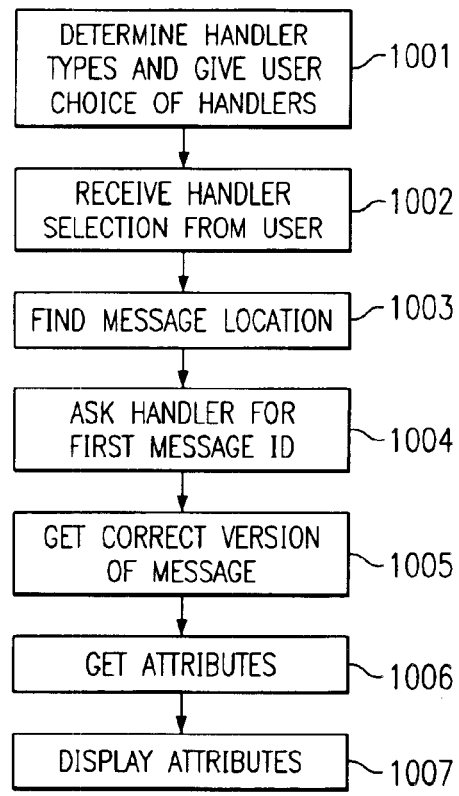
FIG. 10 depicts a flowchart illustrating the process of displaying the new log data via the GUI console in accordance with the present invention.

Referring now to FIG. 10, a flowchart illustrating the process of displaying the new log data via the GUI console 500 is depicted in accordance with the present invention. The GUI 500 determines the types of handlers that are available and gives the user a choice among the handlers (step 1001). The user then selects one of the handlers (steps 1002). The GUI 500 then finds the message location (step 1003) and asks the handler for the first messageID (step 1004). The GUI 500 uses the messageID to get the correct version of the message (step 1005). The GUI 500 then gets the attributes (e.g. time, date, language) based on preferences specified by filter settings (step 1006) and then displays the message, with the proper attributes, to the user (step 1007).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for editing data in a distributed computer network, the method comprising the computer implemented steps of:
    in response to a request from a user, opening a log file and noting an entry associated with a message of interest;
    calling a message locator which locates the message of interest in a designated location and bookmarks the message of interest;
    calling a bookmark I/O component which locates and modifies the bookmarked message of interest to create a modified message, and the modified message back to the designated location; and
    displaying the modified message to the user.

2. The method according to claim 1, further comprising creating bookmark note data for the message of interest, wherein the bookmark note data comprises at least one of the following:
    a name of a node within the distributed network which generated the message of interest;
    a name of the user submitting the request; and
    current time and data when the bookmark note data is created.

3. The method according to claim 2, wherein the bookmark note data is sorted according to the current time and date.

4. The method according to claim 2, wherein the bookmark note data is sorted according to the name of the user.

5. The method according to claim 1, wherein the designated location containing the message of interest is determined by a logging handler.

6. The method according to claim 1, wherein the designated location containing the message of interest is a local log file.

7. The method according to claim 1, wherein the designated location containing the message of interest is a logging database.

8. The method according to claim 1, wherein the step of displaying the modified message to the user is by means of a graphical user interface.

9. The method according to claim 1, wherein messages in the designated location are grouped according to a start time and end time, wherein the messages between the start and end times are bookmarked and modified as a group.

10. The method according to claim 1, further comprising associating messages from different nodes within the distributed computer network.

11. The method according to claim 1, wherein multiple users may simultaneously access and edit logging data in the log file.

12. The method according to claim 1, wherein attributes for displaying the modified message are predetermined.

13. The method according to claim 1, wherein attributes for displaying the modified message are customized by the user.

14. A computer program product in a computer readable medium for use in a data processing system, for editing data in a distributed computer network, the computing program product comprising:
    instructions for opening a log file and noting an entry associated with a message of interest;
    instructions for calling a message locator which locates the message of interest in a designated location and bookmarks the message of interest;
    instructions for calling a bookmark I/O component which locates and modifies the bookmarked message of interest to create a modified messagem, and writes the modified message back to the designated location; and
    instructions for displaying the modified message to the user.

15. The computer program product according to claim 14, further comprising instructions for creating bookmark note data for the message of interest, wherein the bookmark note data comprises at least one of the following:
    a name of a node within the distributed network which generated the message of interest;
    a name of the user submitting the request; and
    current time and data when the bookmark note data is created.

16. The computer program product according to claim 15, wherein the bookmark note data is sorted according to the current time and date.

17. The computer program product according to claim 15, wherein the bookmark note data is sorted according to the name of the user.

18. The computer program product according to claim 14, wherein the designated location containing the message of interest is determined by a logging handler.

19. The computer program product according to claim 14, wherein the designated location containing the message of interest is a local log file.

20. The computer program product according to claim 14, wherein the designated location containing the message of interest is a logging database.

21. The computer program product according to claim 14, wherein messages in the designated location are grouped according to a start time and end time, wherein the messages between the start and end times are bookmarked and modified as a group.

22. The computer program product according to claim 14, wherein multiple users may simultaneously access and edit logging data in the log file.

23. The computer program product according to claim 14 further comprising instructions for sorting a filter to display only specified types of bookmarks.

24. The computer program product according to claim 14, wherein attributes for displaying the modified message are predetermined.

25. The computer program product according to claim 14, wherein attributes for displaying the modified message are customized by the user.

26. A method for a plurality of users to simultaneously annotate a log file in which events in a distributed computer environment are recorded, the method comprising the steps of:
    responsive to a first user input from a first user at a node coupled to the distributed environment, retrieving at least a first event record in the log file from a logging system;

responsive to a second user input from the first user, modifying the first event record;

sending the modified first event record to the logging system;

responsive to a first user input from a second user at a second node coupled to the distributed environment, retrieving at least a second event record in the log file from the logging system;

responsive to a second user input from the second user, modifying the second event record;

sending the modified second event record to the logging system; and updating the log file to reflect the modified first and second event records by the logging system;

wherein the modification of the first and second event records is accomplished contemporaneously.

27. The method according to claim 26, wherein the modification to the first and second event records is bookmarking the first and second event records.

28. The method according to claim 26, wherein the modification to the first and second event records is annotating the first and second event records.

29. The method according to claim 26, wherein a plurality of copies of the log file are stored in a plurality of locations in the distributed environment and updates are sent to each of the plurality of locations to reflect the modification of the first and second event records.

30. A computer program product in a computer readable medium for use in a data processing system, for a plurality of users to simultaneously annotate a log file in which events in a distributed computer environment are recorded, the computer program product comprising:

responsive to a first user input from a first user at a node coupled to the distributed environment, instructions for retrieving at least a first event record in the log file from a logging system;

responsive to a second user input from the first user, instructions for modifying the first event record;

instructions for sending tho modified first event record to the logging system;

responsive to a first user input from a second user at a second node coupled to the distributed environment, instructions for retrieving at least a second event record in the log file from the logging system;

responsive to a second user input from the second user, instructions for modifying the second event record;

instructions for sending the modified second event record to the logging system; and instructions for updating the log file to reflect the modified first and second event records by the logging system;

wherein the modification of the first and second event records is accomplished contemporaneously.

31. The computer program product according to claim 30, wherein the modification to the first and second event records is bookmarking the first and second event records.

32. The computer program product according to claim 30, wherein the modification to the first and second event records is annotating the first and second event records.

33. The computer program product according to claim 30, wherein a plurality of copies of the log file are stored in a plurality of locations in the distributed environment and updates are sent to each of the plurality of locations to reflect the modification of the first and second event records.

34. A system for editing data in a distributed computer network, the system comprising:

a register which, in response to a request from a user, opens a log file and notes an entry associated with a message of interest;

a message locator which locates the message of interest in a designated location and bookmarks the message of interest;

a bookmark I/O component which locates and modifies the bookmarked message of interest to create a modified message, and writes the modified message back to the designated location; and a display component which displays the modified message to the user.

35. A system for a plurality of users to simultaneously annotate a log file in which events in a distributed computer environment are recorded, the system comprising:

a first retrieving component which retrieves at least a first event record in the log file from a logging system responsive to a first user input from a first user at a node coupled to the distributed environment;

a first editing component which modifies the first event record responsive to a second user input from the first user;

a first communication component which sends the modified first event record to the logging system;

a second retrieving component which retrieves at least a second event record in the log file from the logging system responsive to a first user input from a second user at a second node coupled to the distributed environment;

a second editing component which modifies the second event record responsive to a second user input from the second user;

a second communication component which sends the modified second event record to the logging system; and a register which updates the log file to reflect the modified first and second event records by the logging system;

wherein the modification of the first and second event records is accomplished contemporaneously.

* * * * *

UNITED STATES PATENT AND TRADEMARK OFFICE
CERTIFICATE OF CORRECTION

PATENT NO. : 6,944,647 B2 Page 1 of 1
APPLICATION NO. : 09/895116
DATED : September 13, 2005
INVENTOR(S) : Shah et al.

It is certified that error appears in the above-identified patent and that said Letters Patent is hereby corrected as shown below:

Col. 10, line 17: after "modified" delete "messagem" and insert --message--.

Col. 10, line 52: after "for" delete "sorting" and insert --setting--.

Signed and Sealed this

Fifth Day of December, 2006

JON W. DUDAS
*Director of the United States Patent and Trademark Office*